(12) United States Patent
Paul et al.

(10) Patent No.: US 7,023,859 B2
(45) Date of Patent: Apr. 4, 2006

(54) METHOD FOR CONFIGURING A TRIE MEMORY FOR THE PROCESSING OF DATA PACKETS, AND PACKET-PROCESSING DEVICE IMPLEMENTING SUCH A METHOD

(75) Inventors: Olivier Paul, Arthez de Bearn (FR); Sylvain Gombault, Rennes (FR); Maryline Laurent Maknavicius, Courcouronnes (FR); Joël Lattmann, Champs sur Marne (FR); Christian Duret, Chatillon (FR); Hervé Guesdon, Grenoble (FR)

(73) Assignee: France Telecom, Paris (FR)

( * ) Notice: Subject to any disclaimer, the term of this patent is extended or adjusted under 35 U.S.C. 154(b) by 941 days.

(21) Appl. No.: 10/082,647

(22) Filed: Feb. 25, 2002

(65) Prior Publication Data

US 2003/0156590 A1  Aug. 21, 2003

(30) Foreign Application Priority Data

Feb. 12, 2002  (FR) .................................. 02 01705

(51) Int. Cl.
*H04L 12/56* (2006.01)

(52) U.S. Cl. ..................... 370/400; 370/415; 370/252; 709/238; 703/3

(58) Field of Classification Search ................ 370/400, 370/389, 252, 238, 415; 707/3; 709/238–244
See application file for complete search history.

(56) References Cited

U.S. PATENT DOCUMENTS

| 5,781,772 A | * | 7/1998 | Wilkinson et al. ............. 707/3 |
| 6,014,659 A | * | 1/2000 | Wilkinson et al. ............. 707/3 |

FOREIGN PATENT DOCUMENTS

| EP | 1 030 493 A1 | 8/2000 |
| WO | WO 02/09367 A1 | 1/2002 |

* cited by examiner

*Primary Examiner*—John Pezzlo
(74) *Attorney, Agent, or Firm*—Gardner Carton & Douglas LLP

(57) ABSTRACT

A Trie-type associative memory is used for an analysis of binary strings situated at defined locations of data packets. An analysis tree is established, which comprises stages associated with the locations, and paths each arriving at an action attributed on the basis of the values of the binary strings read from a data packet. The tree is then transcribed into the Trie memory.

27 Claims, 9 Drawing Sheets

FIG. 2.

| Octet | 1 | 2 | 3 | 4 | 5 | 6 | 7 | 8 | 9 | 10 | 11 | 12 |
|-------|---|---|---|---|---|---|---|---|---|----|----|----|
| CLIP1 | ATM HEADER | | | | | AA | AA | 03 | 00 | 00 | 00 | 08 |
| CLIP2 |   |   |   |   |   |   | LENGTH | | | | | D |

| Octet | 13 | 14 | 15 | 16 | 17 | 18 | 19 | 20 | 21 | 22 | 23 | 24 |
|-------|----|----|----|----|----|----|----|----|----|----|----|----|
| CLIP1 | XX | 45 |    | LENGTH | | | IP SRC ADDRESS | | | | | |
| CLIP2 |    |    | P  |    |    |    |    | D  |    |    | P  |    |

| Octet | 25 | 26 | 27 | 28 | 29 | 30 | 31 | 32 | 33 | 34 | 35 | 36 |
|-------|----|----|----|----|----|----|----|----|----|----|----|----|
| CLIP1 | ESS | IP SRC ADDRESS | | | | IP DST ADDRESS | | | | SRC PORT | | DST |
| CLIP2 | SRC PORT | | | | DST PORT | | | UD | | | | |

| Octet | 37 | 38 | 39 | 40 | 41 | 42 | 43 | 44 | 45 | 46 | 47 | 48 |
|-------|----|----|----|----|----|----|----|----|----|----|----|----|
| CLIP1 | PORT | | | | | | | | | | | |
| CLIP2 |    |    |    | UD |    |    |    |    | TD |    |    |    |

| Octet | 49 | 50 | 51 | 52 | 53 |
|-------|----|----|----|----|----|
| CLIP1 |    |    |    |    |    |
| CLIP2 |    |    |    |    |    |

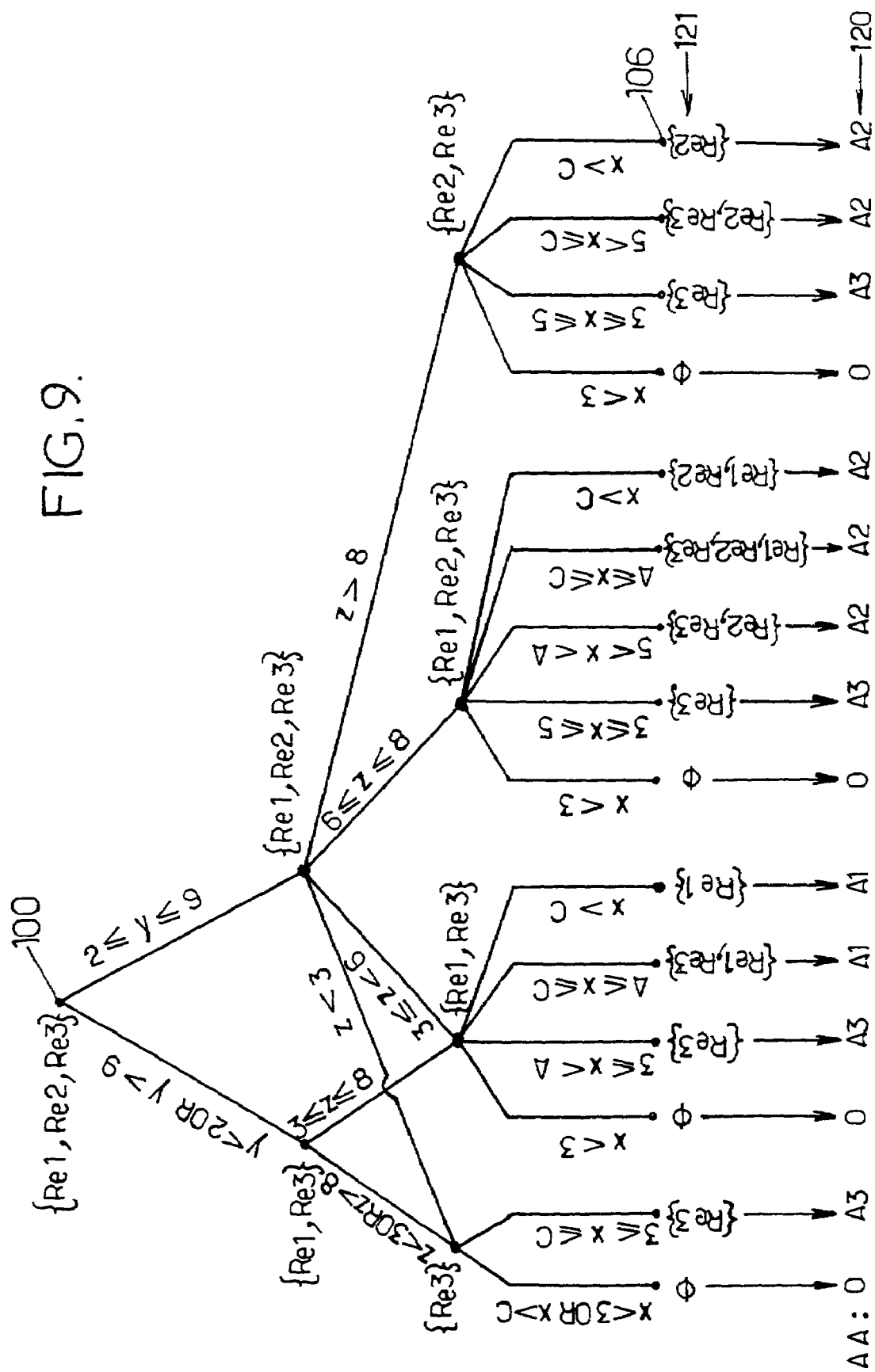

METHOD FOR CONFIGURING A TRIE MEMORY FOR THE PROCESSING OF DATA PACKETS, AND PACKET-PROCESSING DEVICE IMPLEMENTING SUCH A METHOD

BACKGROUND OF THE INVENTION

The present invention relates to a method for processing data packets according to rules applied to each data packet, on the basis of data contained in this packet.

It relates more particularly to a method for configuring a particular memory device used for the processing of data packets.

International patent application WO 02/09367 discloses an access control device for ATM networks. This device comprises an access controller which configures traffic analysers in order to process, one by one, the carrier cells of the ATM traffic. The traffic analysers operate by analysis of the content of the ATM-traffic-carrier cells, associating routing references with them by means of a Trie-type associative memory. Such devices can also be used in IP routers, security devices (Firewall), traffic-measuring devices, etc. Depending on the application, the processing allocated to each data packet may be an addressing of this packet, a change of data of this packet, the recording of an item of information established on the basis of this packet, or, in general, an action determined on the basis of the content of this packet.

The benefit in the use of a Trie-type memory is of allowing rapid analysis, in any order, of parts of the contents of the traffic-carrying cells. Such a memory and its use in the analysis of data packets are described in the Patent Application EP-A-1 030 493 or U.S. patent application Ser. No. 09/493,583, which is incorporated herein by reference.

The configuration of the Trie memory is implemented within the access controller.

SUMMARY OF THE INVENTION

An object of the present invention is to obtain a configuration of this memory which makes it possible to assign processing appropriate to each data packet on the basis of parts of its content.

The invention proposes a method for configuring a Trie-type associative memory for the processing of data packets based on a set of rules, the Trie memory being used for analyzing binary strings situated at defined locations in each data packet. Each rule attributes an action to a packet based on the values of the binary strings. The Trie memory includes registers made up of a defined number of individual cells for receiving respective references. The method comprises the steps of:

a—translating the set of rules into a packet analysis tree, comprising nodes distributed into successive stages respectively associated with the locations considered in a defined order, arcs and leaves corresponding to actions which can be attributed by the rules, the first stage of the tree comprising a single node called root node of the analysis tree, each arc having a start node and an arrival point consisting either of a node of the stage following that of said start node or of a leaf, and being associated with a respective domain of binary string values possible at said location, the analysis tree defining paths each consisting of a series of n arcs, n being an integer at least equal to 1, the first arc of the series having as start node the root node of the analysis tree, the arrival point of each arc of a path other than the last arc being the start node of the following arc of said path, and the arrival point of the last arc of the path being a leaf corresponding to an action attributed according to the set of the rules to each packet having, at the n locations associated respectively with the stages of the start nodes of the n arcs of said path, binary string values falling into the n domains associated respectively with said arcs;

b—allocating a group of registers of the Trie memory, including a gatekeeper register, to each node of the analysis tree belonging to a stage associated with a location, and recording references in the cells of the group of registers such that, by analyzing from the gatekeeper register the binary string value contained at said location in a packet, a final reference is obtained depending on which domain contains the value from among the domains of values associated with the arcs having said node as start node and such that:

if the arc associated with the domain containing the value has, as arrival point, a leaf corresponding to an action, the final reference designates the action as being attributed to the packet, and if the arc associated with the domain containing the value has another node of the following stage as arrival point, the final reference designates said other node so as to carry on by analyzing the binary string value contained in the packet at the location associated with said following stage.

Such a mode of configuration of the Trie memory offers great flexibility in taking into account a wide diversity of rules for classifying the traffic, which may correspond to various actions to be undertaken on the data packets depending on the content of the locations analysed. The paths of the tree correspond to analysis graphs which are run along by means of indexing and indirection operations in the Trie memory thus configured.

Such an organisation of the analysis structure makes it possible to guarantee that the duration of analysis of any data packet is limited by an upper bound fixed by the analysis of concern. This upper bound corresponds to the depth of the analysis tree, i.e. to the number of locations to analyse. This allows the operator of a communications network using the invention to carry out real-time processing of the data packets which are presented at the input of the traffic analyser by allocating sufficient analysis means.

In a preferred embodiment of the method, the order considered in the step of construction of the analysis tree advantageously results from a sorting of the locations carried out after counting elementary intervals. For each of the locations, consecutive elementary intervals are determined, covering binary string values possibly appearing at this location, each elementary interval being such that the action attributed by each of the rules is not altered by a change, within said elementary interval, of the value of the binary string situated at said location in a processed packet. The sorting of the locations is then carried out in an order such that the location for which the largest number of elementary intervals has been defined is placed last. In particular, it is possible to sort the locations in the order of increasing numbers of elementary intervals.

An advantage of such sorting of the locations lies in the minimizing of the size of the Trie memory necessary for the analysis of the content of each data packet, on the basis of which action is attributed to each packet according to the set of rules. Thus, a large number of data packets corresponding to a great variety of actions attributed to each of them can be processed with a single operation of analysis of the contents of these packets.

In general, a Trie memory takes the shape of a table whose rows, or registers, include a fixed number of cells, for example 4, 8, 16 or 32 cells. The size of the Trie memory then corresponds to the number of registers of this memory. The above-mentioned embodiment of the present invention thus makes it possible to reduce the number of registers necessary to carry out a given analysis of the content of the data packets.

The method of configuring the Trie memory of the invention comprises the transcribing of the analysis tree into this memory in the form of references written into the cells of the memory. A large analysis tree generally requires a Trie memory of correspondingly greater size. It is consequently advantageous to design the analysis tree and its transcription in such a way as to reduce the necessary size of the Trie memory.

The number of stages of nodes of the analysis tree corresponds to the number of locations within data packets, at which the binary strings are to be read.

It is possible to determine an upper bound of the dimension of the analysis tree as follows. The first stage of the analysis tree comprises the root node as single node. The second stage of the analysis tree comprises a number of nodes equal at most to the number of elementary intervals defined for the location placed first according to the order adopted for the locations. The number of nodes of the third stage of the analysis tree is at most equal to the product of the two numbers of elementary intervals defined respectively for the two locations with which the first two stages of nodes are associated. Recursively, the number of nodes of any stage of the analysis tree which is associated with a given location is less than or equal to the product of the number of elementary intervals defined respectively for all the locations preceding the location with which the stage of concern is associated according to the sorting order of the locations.

If N designates the number of locations of binary strings defined in the data packets on which the analysis of the packets is based, the number of nodes of the last stage of the analysis tree is therefore less than the product of the (N−1) numbers of elementary intervals corresponding to the first (N−1) locations according to the order of sorting of the locations. Put another way, it is less than the value equal to the product of all the numbers of elementary intervals divided by the number of elementary intervals of the last location according to this order. This value therefore constitutes an upper bound of the number of nodes of the last stage of the analysis tree, which corresponds to an upper limit on the size of the necessary Trie memory. For elementary intervals fixed for all the locations, this upper bound is smallest when the order of sorting of the locations is such that that one of the locations for which the largest number of elementary intervals has been defined is placed last.

In certain applications of the method, the binary strings read at said locations are numbers or values comprising numbers. It is then particularly convenient to define the elementary intervals by complying with an order relationship between these numbers, or by using an order relationship matching the structure of the values read, in order to allow rapid configuration of the Trie memory.

In an advantageous embodiment of the method, the translation of the set of rules into an analysis tree is such that at least one node of the analysis tree is the arrival point of a plurality of arcs originating from distinct start nodes of the preceding stage. This achieves a compression of the classification structures defined in the Trie memory, which provides a substantial space saving in this memory.

For that, one may consider that a sub-tree is associated with each node of the analysis tree different from its root. This sub-tree has a root constituted by said node and is made up of the nodes, arcs and leaves encountered from said node along the various paths passing through said node. The translation of the set of rules is then operated in such a way that the analysis tree does not include first and second sub-trees having separate roots and such that their respective nodes, arcs and leaves may be paired in such a way that each node of the first sub-tree is paired with a node of the second sub-tree belonging to a same stage, that each leaf of the first sub-tree is paired with a leaf of the second sub-tree corresponding to a same action, and that two paired arcs of the first and the second sub-trees have start nodes which are paired together and arrival points which are paired together, and are associated with the same domain of values.

Each rule may be defined by an action and by ranges of values respectively corresponding to at least some of the locations, and attribute said action to the packets having, at said locations, binary strings values respectively falling into said ranges. In order to have a generic treatment of all the rules, the following care is taken: when, for a given location, a rule does not exhibit any explicit range, a range is added to this rule which corresponds to this location and which comprises all the binary string values which can be read in the data packets at this location.

A subset of rules is then associated with each node of a (p+1)-th stage of the analysis tree, p being an integer greater than 0. This subset is composed of the rules of the set such that each range of values corresponding to a location associated with one of the p first stages of the tree has a non-empty overlap with the domain of values associated with the arc of each path passing through said node and having a start node in said stage. A subset consisting of the set of the rules can be considered to be associated with the root node. The translation of the set of rules preferably comprises the following steps for each node of the p-th stage associated with a first subset of rules:

determining domains of values covering binary string values possibly appearing at the p-th location considered in said order, whereby each domain is such that the action attributed by each of the rules of the first subset is not altered by a change, within said domain, of the value of the binary string situated at the p-th location in a processed packet; and for each of said domains of values:
generating an arc associated with said domain, having said node of the p-th stage as start node;
detecting each rule of the first subset which is defined by at least one range of values including said domain;
if no rule detected, assigning a leaf of the tree corresponding to a default action as arrival point of said arc;
if, for each detected rule, no range of values corresponds to any one of the locations following the p-th location in said order, assigning a leaf of the tree corresponding to an action of a detected rule as arrival point of said arc;
if, for at least one detected rule, a range of values corresponds to one of the locations following the p-th location in said order, attributing a node of the (p+1)-th stage of the tree as arrival point of said arc, said node of the (p+1)-th stage being associated with a second subset composed of the detected rules of the first subset.

Priorities may be respectively assigned to the rules of the set. In this case, when several rules are detected and none of their ranges of values corresponds to one of the locations following the p-th location, the action corresponding to the leaf of the tree attributed to said arc is the action of one of the detected rules, selected on the basis of the assigned priorities.

For compressing the analysis tree the following steps are executed, when at least one rule is detected having a range of values corresponding to one of the locations following the p-th location:

searching whether a node of the (p+1)-th stage of the tree associated with the second subset has already been generated;

if the search fails, generating such node in the (p+1)-th stage;

if the search identifies a node of the (p+1)-th stage, attributing the identified node as arrival point of said arc.

The present invention also relates to a data packet processing device comprising a Trie-type associative memory and a controller configured to implement a method for configuring the Trie memory as disclosed hereabove. Such devices may especially be used in the following applications:

the routing, by a communications network, of data packets on the basis of routing rules applied to these packets;

the control of access to a communications network by data packets on the basis of rules for control of access to this network which are applied to these packets;

the acquisition of information relating to data packets transmitted by a communications network.

The data packets may particularly be ATM cells carrying AAL 5 frames, or IP packets.

BRIEF DESCRIPTION OF THE DRAWINGS

FIG. 2 is a table describing information processed by traffic analysers of the device of FIG. 1.

FIG. 9 represents a fourth analysis tree corresponding to the rules given for the analysis tree of FIG. 5, using the sorting of the locations and the method for creating new arc of FIG. 8.

DETAILED DESCRIPTION OF THE INVENTION

Figure 1:
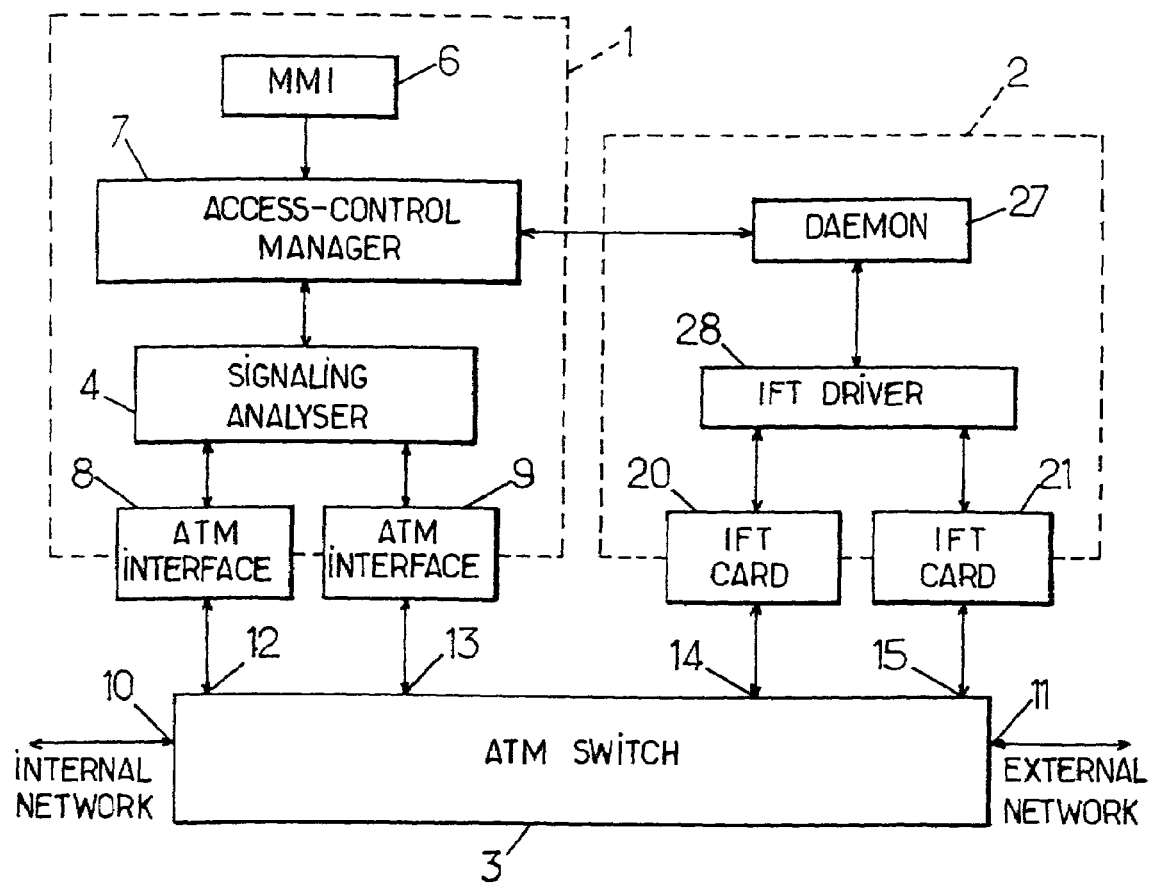
FIG. 1 is a block diagram of an access control device in which the method of the invention is implemented.

The structure of an access control device arranged between two ATM (Asynchronous Transfer Mode) transmission networks, in which the method of the invention can be employed, is described in detail in the aforesaid international patent application WO 02/09367. As indicated in FIG. 1, an access control device may be made up of two main parts 1, 2, operating jointly with an ATM switch 3. The first part 1 is dedicated to giving effect to an access control policy and to the analysis of the ATM signalling. The result of this analysis is used to construct a configuration dynamically. This is used by the second part 2 in order to provide an access control service based on the information transported in the ATM cells. This second part 2 is capable of recovering the ATM-, IP- and transport-level information so as to decide whether a communication should be authorized or prohibited. The configuring of the assembly is achieved by way of a unique language.

The part 1 can be formed by means of a workstation, such as a station marketed by the company Sun Microsystems, Inc. The signalling analyser 4 is the element of this part 1 which carries out the access control actions in terms of the ATM signalling in combination with the access control manager 7.

The part 2 may be formed by means of a PC-type station operating, for example, with the Solaris x86 operating system. This station is equipped with cards 20, 21 for real-time analysis of the ATM cells, or traffic analysers, called IFT (IP Fast Translator) cards below, which carry out the access control actions ATM cell by ATM cell.

In order to allow the expression of access control policies, an Access Control Policy Description Language (ACPDL) is used. The definition of the ACPDL is based on the Policy Description Language (PDL) which is in progress to be defined within the working group dealing with policies at the IETF (see J. Strassner, et al., Policy Framework Definition Language, draft-ietf-policy-framework-pfdl-00. txt, Internet Engineering Task Force, 17 Nov. 1998). In this language, a policy is defined by a set of rules, each rule itself consisting of a set of conditions and of an action which is carried out when all the conditions are fulfilled. The following expression (expressed in the Backus Naur formalism, BNF) describes the general form of a rule:

Rule :: =IF <Conditions> THEN <Action>

All the conditions have the same generic structure expressed below by means of the BNF formalism:

Condition :: =<ACCESS CONTROL PARAMETER>

<RELATIONAL OPERATOR> <VALUE>

Depending on the level in the protocol stack, several types of access control parameters can be used:

at the ATM level, the parameters of interest are described in the article by O. Paul, et al., "Manageable parameters to improve access control in ATM networks", HP-OVUA Workshop, Rennes, France, April 1998. Among these parameters it is possible to choose the type of traffic, the connection identifiers, the addressing information, the QoS descriptors and the service descriptors;

at the transport level, most of the parameters considered are those which are usually used in order to carry out the filtering of the packets in the filtering routers (for example the addressing information, the source and destination ports, the flags in the case of TCP connections, etc);

at the application level, two generic parameters are considered: the identifier of the user of the application as well as the state of the application;

time-domain information is also included so as to specify when a rule has to be applied.

The actions likewise have a generic structure (BNF notation):

Action :: =<ACTION> <ACTION LEVEL> <LOG LEVEL>

An action is divided into three parts. The first indicates whether the communication described by the conditions should be permitted or denied. The parameter <ACTION LEVEL> corresponds to the protocol layer in which the action has to be carried out. The last part describes the importance accorded to the access control event and allows classification of the results.

The following paragraph shows how the ACPDL language can be used in order to express an access control service example. In this example, each item of equipment is identified by its source address (IP_SRC_ADDRESS) and its destination address (IP_DST_ADDRESS). The WWW service is identified by the source (SRC_PORT) and destination (DST_PORT) ports. The second command line given in the example is used so as to prohibit requests for connection to the WWW port of an internal station.

IF (IP_SRC_ADDRESS=192.165.203.5 255.255.255.255) AND (IP_DST_ADDRESS=0.0.0.0 0.0.0.0) AND (SRC_PORT>1023) AND (DST_PORT=80) THEN PERMIT TRANSP_CONNECTION;

IF (IP_SRC_ADDRESS=0.0.0.0 0.0.0.0) AND (IP_DST_ADDRESS=192.165.203.5 255.255.255.255) AND (SRC_PORT=80) AND (DST_PORT >1023) AND (TCP_FLAG <> SYN) THEN PERMIT TRANSP_CONNECTION;

The access control policy is defined by the security officer by means of a man-machine interface (MMI) 6 of the station 1, by using the ACPDL language. It is used to configure the two parts of the controller. However, this policy cannot be used directly by the two access control tools 4, 20/21. The manager 7 is the module which makes it possible to solve this problem by translating the access control policy into configuration commands for the two tools.

This translation process can be divided into two main parts. The first one is the translation of the policy into three static configurations:

at the level of the ATM signalling, this configuration comprises a description of the communications which have to be controlled. Each communication is described by a set of information elements (IE) and by an action (Permit or Deny). This configuration is sent to the signalling analyser 4;

at the TCP/IP level, the configuration comprises a description of the packets which have to be controlled. This part of the policy can be generic, which means that the rules which are described there are not dedicated to a particular ATM connection. This part can also be related to an ATM connection by the expression of conditions bearing on connection identifiers;

at the ATM cell level, the configuration comprises a description of the ATM cells which have to be controlled. These cells are divided according to the fields they can contain. The set of values each field can take is described by a tree. This configuration is sent to the IFT cards 20, 21.

The second part of the configuration process takes place when a connection request is received by the signalling analyser 4. Once the access control process has been carried out, the signalling analyser 4 sends the manager 7 the necessary information for carrying out the dynamic configuring of the IFT cards 20, 21. The information supplied by the signalling analyser 4 comprises:

the VPI and VCI (Virtual Path Identifier, Virtual Channel Identifier) connection identifiers;

the source and destination ATM addresses;

a service descriptor (Classical IP over ATM (CLIP), ATM native applications). When an additional layer is used above the ATM model, the signalling analyser 4 also supplies the encapsulation (with or without SNAP/LLC header);

the direction of the communication.

In a CLIP environment, the manager 7 uses the source and destination ATM addresses in order to find the corresponding IP addresses. This translation is carried out by means of a file describing the correspondences between IP and ATM addresses. It may also use an address-resolution server (ATMARP).

The manager 7 next tries to find a correspondence between the IP addresses and the generic rules of TCP/IP level access control. The subset of rules obtained is instanced with the IP addresses and associated with the other information (addresses, encapsulation, connection identifiers, direction). This set of information is used by the manager so as to construct the analysis tree which will be used to configure the IFT cards, and it is kept all along the life of the connection. On closure of the connection, the manager 7 receives a signal from the signalling analyser 4 so as to reconfigure the IFT cards 20, 21 as appropriate by erasing the information relating to the connection. The manager next destroys the information associated with the connection.

The signalling analyser 4 is based on two functions. The first one is the redirection of the signalling messages originating from the internal and external networks towards a filter belonging to the analyser 4. The second one is the capability of splitting the signalling messages according to the UNI 3.1 specification of the ATM Forum (ATM User-Network Interface Specification, Version 3.1, ATM Forum, July 1994) and of transmitting or deleting these messages on the basis of the access control configuration supplied by the manager 7.

The station 1 is provided with two ATM interface cards 8, 9 linked respectively to two interfaces 12, 13 of the switch 3. The other interfaces represented of the switch 3 are denoted 10 (internal network), 11 (external network), 14 and 15 (IFT cards 20 and 21).

In order to redirect the signalling, the ATM switch 3 is configured in such a way as to forward the signalling messages to the station 1. This configuration can be achieved by deactivating the signalling protocol on the interfaces 10, 11, 12 and 13. A virtual channel (VC) then has to be constructed between each pair of interfaces for each signalling channel. The signalling channels are identified, for example, by a virtual-channel identifier (VCI) equal to 5.

With the preceding configuration, the signalling messages originating from the external network are forwarded to the interface 13 of the station 1 while the messages originating from the internal network are forwarded to the interface 12.

When signalling messages are received by the signalling analyser 4, they are split into information elements according to the UNI specification 3.1. The information elements are then split into basic information such as the addresses, the connection identifiers, the call reference, the quality-of-service descriptors and the service identifiers. The analyser 4 next ascertains whether the message can be associated with an existing connection by means of the type of the message and of the call reference. If the connection is new, a connection descriptor containing this information is constructed. When the connection already exists, the connection descriptor is updated. The connection descriptor is associated with the status of the connection and with the interface of origin. It is identified by a connection identifier. The descriptor is then sent to the filter of the signalling analyser 4 in order to be analysed.

When the filter of the signalling analyser 4 receives a connection descriptor, it compares the parameters describing the connection with all the communications described by the access control policy. If a correspondence is found, the filter applies the action associated with the communication. In the opposite case, it applies the default action which is that of prohibiting the connection. When the action consists of a prohibition, the filter destroys the connection descriptor. In the opposite case, it sends the connection descriptor to a message-construction module. When the connection descriptor indicates that a CONNECT message has been received, a subset of the parameters of the connection descriptor is sent to the manager 7 as indicated above:

- the VPI/VCI connection identifiers, obtained from the Connection Identifier IE;
- the source and destination ATM addresses, supplied by the Called Party Identifier and Calling Party Identifier IEs;
- the service descriptors, obtained from the Broadband Higher Layer Identifier (BHLI) and Broadband Lower Layer Identifier (BLLI) IEs;
- the direction, supplied by the name of the interface associated with the connection descriptor.

When the connection descriptor indicates the reception of a RELEASE_COMPLETE message, which completes the release of a connection, the connection descriptor is again sent to the manager 7. Communication between the manager 7 and the signalling filter can be carried on in the conventional way by means of a shared memory segment and of signals.

The IFT cards considered here for implementing the invention are of the type described in the European Patent Application number 00400366.1 filed on Feb. 9, 2000 by the Applicant. They are based on the use of a Trie-type associative memory for the analysis of parts of the content of ATM cells, and for the assigning to each cell of an action defined by the access control policy. These cards possess the following noteworthy characteristics:

- they allow the analysis of the first cell of each AAL5 (ATM Adaptation Layer No 5) frame, and the modification of the corresponding cells on the basis of the analysis;
- they can operate at a speed of 622 Mbit/s by virtue of a rapid and flexible method of cell analysis;
- the delay introduced by the analysis can be bounded and depends on the configuration of the card;
- they can be configured dynamically without interrupting the analysis process;
- they can be integrated into PC-type equipment operating under Solaris.

FIG. 2 describes the information which can be analysed by the IFT cards 20, 21 in the case of the CLIP (CLIP1) and CLIP without SNAP-LLC encapsulation (CLIP2) protocols. The UD and TD fields indicate the start of the data segments in the case of the UDP and TCP protocols, respectively. This means that, in the general case, the IFT cards have access to the information at ATM, IP, TCP and UDP level and, in certain cases, information at application level. It should be noted, however, that the optional fields possibly present in the IP packet are not represented. The presence of these fields (of variable length) may push back the TCP- or UDP-level information in the second ATM cell.

As in the case of the signalling, the first part of the access control process at the ATM cell level consists in redirecting the traffic originating from the internal and external networks to the IFT cards 20, 21. However, in this case, the configuration has to preserve the configuration implemented for the control of the signalling. By way of example, the virtual channels identified by a VCI value equal to 31 are deliberately left free so as to allow the ATM switch 3 to reject the ATM cells belonging to a communication which has to be prohibited. The ATM switch 3 is then configured so as to create a virtual channel for each value of VCI other than 5 and 31 between each interface air (10, 14) and (11, 15).

The IFT cards of concern allow only the analysis of unidirectional streams. That means that the streams originating from the internal and external networks have to be separated. This operation is particularly simple in the case of a physical layer of the Mono Mode Fibre type used by the cards, since the sending and receiving fibres are physically separated.

The second part of the access control process is the configuring of the IFT cards 20, 21, so that they supply the desired access control service. As indicated above, this configuring is done by the manager 7. The IFT cards have been designed at the outset to be managed remotely by several managers. Appropriate software 27 (RPC Daemon) is then used in the station 2 in order to serialize the demands addressed to the control circuit 28 (driver) of the cards 20, 21. At the manager 7 end, a library gives access to the configuration functions. This library translates the local calls into remote calls on the station 2. The communications between the two items of equipment are achieved, for example, via a dedicated, Ethernet-type network.

The configuring of the Trie memories of the cards 20, 21 is based on a description of the communications to be controlled in the form of trees. Each branch of the tree describes the coded value of a binary string, for example of 4 bits, which can be found during the analysis process. This process consists in scanning the ATM cell portion to be analysed in segments of 4 successive bits serving for access to the content of the Trie memory included in each IFT card. An analysis tree, constructed on the basis of an access control instruction supplied by the manager 7, corresponds to a given series of segments of 4 bits found at defined locations by scanning the ATM cell. The root of the tree corresponds to a gatekeeper which is recognized so as to begin the analysis of the tree. Examples of analysis trees and of resultant configurations of Trie memories of IFT cards are now presented.

In a general way, each location to be analysed, or field, comprises a number of bits fixed by the size of this field, for example 32 bits. Its analysis in segments is carried out in such a way that the values which each segment can take correspond to the individual cells of one or more registers of the Trie memory used. A quartet, which may take $2^4=16$ values, is particularly adapted to a Trie memory in which each register comprises 16 individual cells. Several registers, or even a large number of registers, are therefore necessary for the analysis of a field, depending on the size of this field with respect to the number of individuals cells of a register.

The analysis of a field in general comprises the analyses of a large number of segments of bits, achieved successively until going on to the analysis of another field of the same cell, or until an action attributed to the cell analysed by the access control policy is obtained. For the sake of simplicity and of clarity of illustration of the invention, although this does not correspond to a real situation, the examples presented thereafter each include only a single quartet for each field on which the analysis bears. For the same reasons of simplicity and of clarity, the number of rules considered and the number of fields taken into consideration for the analysis are very restricted, although a real access control policy may comprise numerous access rules bearing on a larger number of fields of control-protocol information.

A first example is given for two fields x and y read in ATM cells, represented by (x, y) pairs. The binary strings read in the fields x and y are quartets represented by hexadecimal numbers lying between 0 and F.

The rules considered, which are two in number, are as follows:

Rule Re1: if $x \geq 7$ and $3 \leq y \leq 8$, then an action A1 is carried out;

Rule Re2: if $2 \leq x \leq B$ and $y \geq 3$, then an action A2 is carried out.

The rule Re1 is assumed to have priority with respect to the rule Re2 so that the action A1 is carried out alone when it is attributed simultaneously with the action A2 to the same pair (x, y), respectively by each rule. If the condition of none of the two rules Re1 and Re2 is complied with by a given pair (x, y), then a default action O is attributed to this pair.

The actions A1, A2 and O may be simple actions of rejection (DENY) or acceptance (PERMIT) of the cells. They may also correspond to more complex actions, such as continuing with the control of access via the examination of other parameters such as authorized domains attributed to an addressee of the cell of concern.

The action of rejection or of acceptance is coded by means of a particular node causing the end of the analysis and returning the connection identifier which will be attributed to all the cells of the corresponding AAL 5 frame. The DENY action is coded by directing the frame to the non-configured channel (VCI 31) within the switch 3. The VCI 31 is thus used as a dustbin VCI into which to dump all the ATM cells not in accordance with the security policy. The PERMIT action is coded by leaving the connection identifier unchanged.

The set of numbers which may be read in the x field is distributed by the rules Re1 and Re2 into the following 4 intervals: $x<2$, $2 \leq x<7$, $7 \leq x \leq B$ and $x>B$. In a similar way, the set of numbers which may be read in the y field is distributed into the following 3 intervals: $y<3$, $3 \leq y \leq 8$ and $y>8$.

Figure 3:
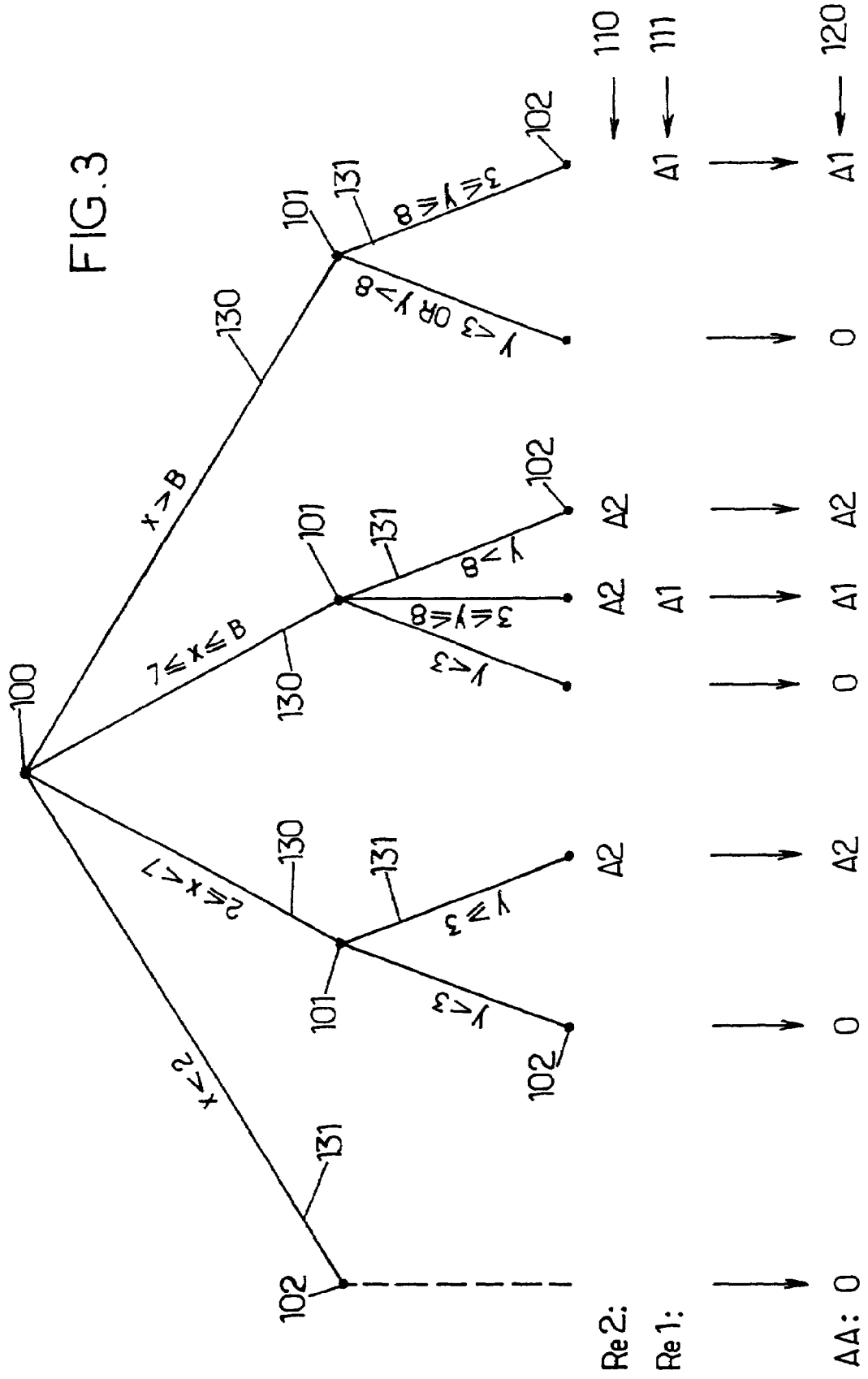
FIG. 3 represents an analysis tree resulting from two particular rules applied to pairs of numbers (x, y), and not using the sorting of the locations according to the first improvement of the present invention.

An analysis tree resulting from the application of the two rules Re1 and Re2 to the (x, y) pairs is represented in FIG. 3, by first of all analyzing the value of x, then the value of y. The root node 100 represents the start point of the analysis of the (x, y) pairs. Three nodes 101 each linked to the root node 100 by an arc 130 correspond to results of the analysis of the value of x with respect to the 4 intervals identified for x. Nodes 102, or leaves of the analysis tree, which are linked to the nodes 101 by arcs 131 correspond respectively, for the preceding results of the analysis of the value of x, to the results of the analysis of the value of y with respect to the 3 intervals identified for y. For certain values of x, for example x<2, the analysis of the (x, y) pairs does not require analysis of the value of y in order to determine the action attributed by the two rules Re1 and Re2. In this case, an arc 131 directly links a leaf 102 to the root node 100. In other cases, 2<x<7 and x> B, the analysis of the value of y does not involve all the bounds of intervals defined for y. This is because certain intervals defined for y can be combined together when they correspond to the same respective actions attributed by the two rules.

Rows 110 and 111 respectively indicate the leaves 102 to which the action A2 and/or the action A1 is attributed by the rules Re2 and Re1, considered separately from each other.

Finally, depending on the priority of these actions, a row 120 indicates the action AA corresponding to each leaf 102 resulting from the application of the two rules Re1 and Re2 combined. Thus, the row 120 repeats the row 111, with filling with the action A2 for those of the leaves 102 to which the row 110 allots the action A2 whereas the row 111 does not allot any action. Further, the row 120 allots the default action O to the leaves 102 which are not considered in any of the rows 110 and 111.

A Trie memory is used, the successive registers R0, R1, R2, etc. of which all comprise sixteen individual cells. An example of configuration of this Trie memory corresponding to the analysis tree of FIG. 3 is as follows:

|    | 0 | 1 | 2 | 3  | 4  | 5  | 6  | 7  | 8  | 9  | A  | B  | C  | D  | E  | F  |
|----|---|---|---|----|----|----|----|----|----|----|----|----|----|----|----|----|
| R0 | ○ | ○ | 1 | 1  | 1  | 1  | 1  | 2  | 2  | 2  | 2  | 2  | 3  | 3  | 3  | 3  |
| R1 | ○ | ○ | ○ | A2 | A2 | A2 | A2 | A2 | A2 | A2 | A2 | A2 | A2 | A2 | A2 | A2 |
| R2 | ○ | ○ | ○ | A1 | A1 | A1 | A1 | A1 | A1 | A2 | A2 | A2 | A2 | A2 | A2 | A2 |
| R3 | ○ | ○ | ○ | A1 | A1 | A1 | A1 | A1 | A1 | ○  | ○  | ○  | ○  | ○  | ○  | ○  |
| R4 |   |   |   |    |    |    |    |    |    |    |    |    |    |    |    |    |
| R5 |   |   |   |    |    |    |    |    |    |    |    |    |    |    |    |    |

In this configuration of the Trie memory, the gatekeeper register R0 is attributed to the analysis of the value of x, and the registers R1, R2 and R3 to the analysis of the value of y. R0 is therefore the register by which the analysis of each (x, y) pair is started. Depending on the value of x of the (x, y) pair analysed, the register R0 forwards to one of the registers R1, R2 or R3 in order to continue with the analysis. The latter register then indicates, depending on the value of y of the (x, y) pair analysed, the action to be carried out associated with the leaf 102 of the analysis tree at which that path arrives which corresponds to the successive results of the analyses of x and of y. According to this configuration, 4 Trie-memory registers are necessary in order to allow the analysis of all the possible (x, y) pairs.

Figure 4:
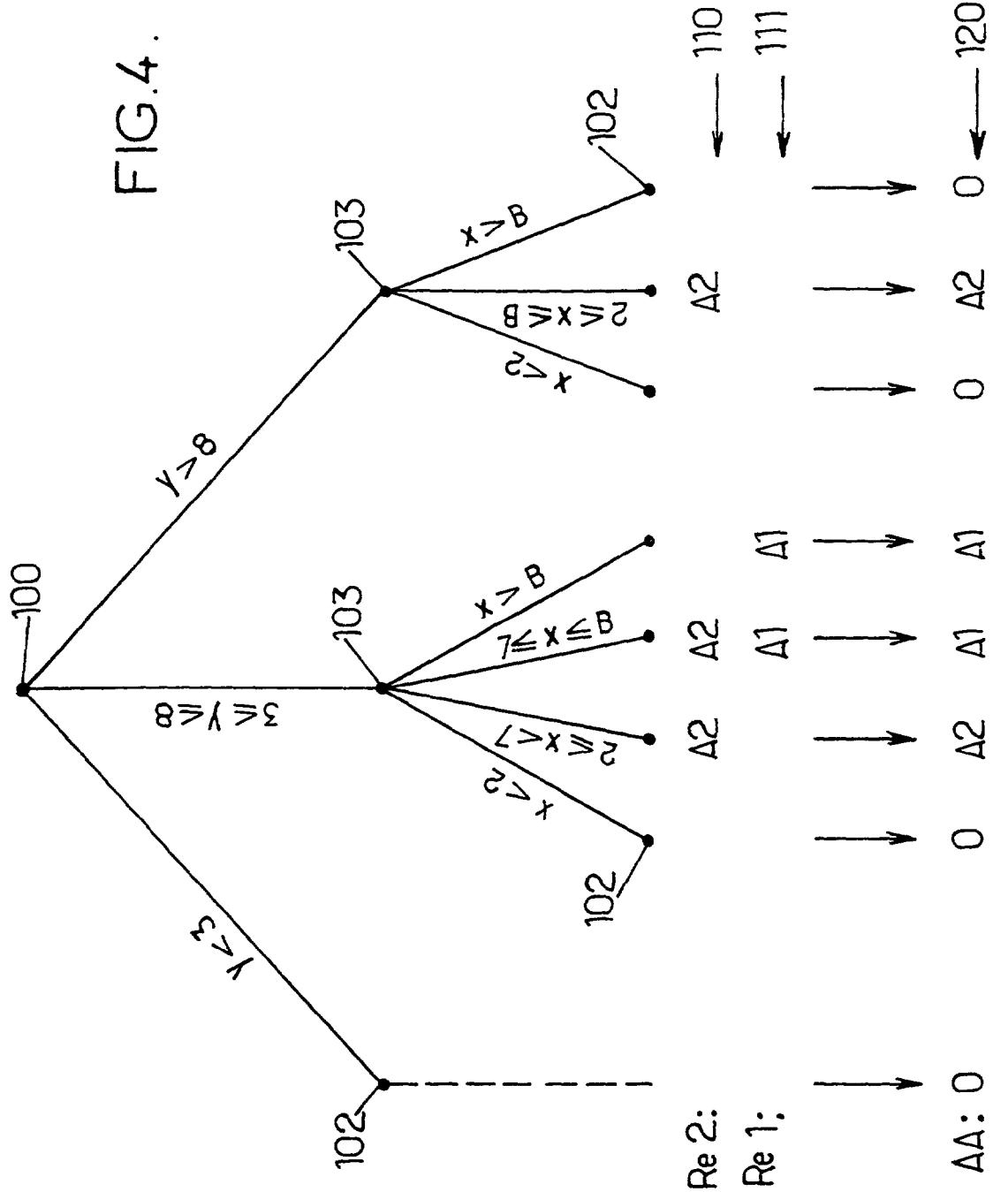
FIG. 4 represents a second analysis tree corresponding to the rules given for the analysis tree of FIG. 3, using the sorting of the locations according to the first improvement of the invention.

By first of all analyzing the value y, then the value x, for application of the same rules Re1 and Re2, an analysis tree as represented in FIG. 4 is obtained. References which are identical between FIGS. 3 and 4 correspond to identical meanings. In FIG. 4, the intermediate nodes 103 correspond to the results of the analysis of the value of y, carried out first, when the analysis of the value of x has to be carried out next. For each pair of numbers (x, y), this tree indicates the same result as the tree of FIG. 3 for application of the rules Re1 and Re2 in the form of the action AA indicated by the row 120.

By applying the same method as before, on the basis of the analysis tree of FIG. 4, for the configuration of the Trie memory, there is obtained:

|    | 0 | 1 | 2  | 3  | 4  | 5  | 6  | 7  | 8  | 9  | A  | B  | C  | D  | E  | F  |
|----|---|---|----|----|----|----|----|----|----|----|----|----|----|----|----|----|
| R0 | ○ | ○ | ○  | 1  | 1  | 1  | 1  | 1  | 1  | 2  | 2  | 2  | 2  | 2  | 2  | 2  |
| R1 | ○ | ○ | A2 | A2 | A2 | A2 | A2 | A1 | A1 | A1 | A1 | A1 | A1 | A1 | A1 | A1 |
| R2 | ○ | ○ | A2 | A2 | A2 | A2 | A2 | A2 | A2 | A2 | A2 | A2 | ○  | ○  | ○  | ○  |
| R3 |   |   |    |    |    |    |    |    |    |    |    |    |    |    |    |    |
| R4 |   |   |    |    |    |    |    |    |    |    |    |    |    |    |    |    |

Thus the sorting of the two locations x and y according to the first improvement of the invention makes it possible, in this example, to reduce by one register the size of the Trie memory which is necessary to allow application of the same processing rules.

A second example relates to a set of rules applied to triplets of numbers (x, y, z), each of these numbers still being a hexadecimal number:

Rule Re1: if $x \geq A$ and $3 \leq z \leq 8$, then an action A1 is carried out;

Rule Re2: if $x>5$ and $2 \leq y \leq 9$ and $z \geq 6$ then an action A2 is carried out;

Rule Re3: if $3 \leq x \leq C$, then an action A3 is carried out.

In this example, the relationship of priority among the three rules is Re2>Re1>Re3. Only the highest-priority action is still finally attributed to each triplet, from among the actions attributed by each of the three rules considered separately. A default action O is still attributed to a triplet (x, y, z) which complies with the conditions of none of the three rules.

These three rules define 5 intervals for the x field: x<3, $3 \leq x \leq 5$, 5<x<A, $A \leq x \leq C$, and x>C, 3 intervals for the y field: y<2, $2 \leq y \leq 9$, and y>9, and 4 intervals for the z field: z<3, $3 \leq z <6$, $6 \leq z \leq 8$, and z>8.

Figure 5:
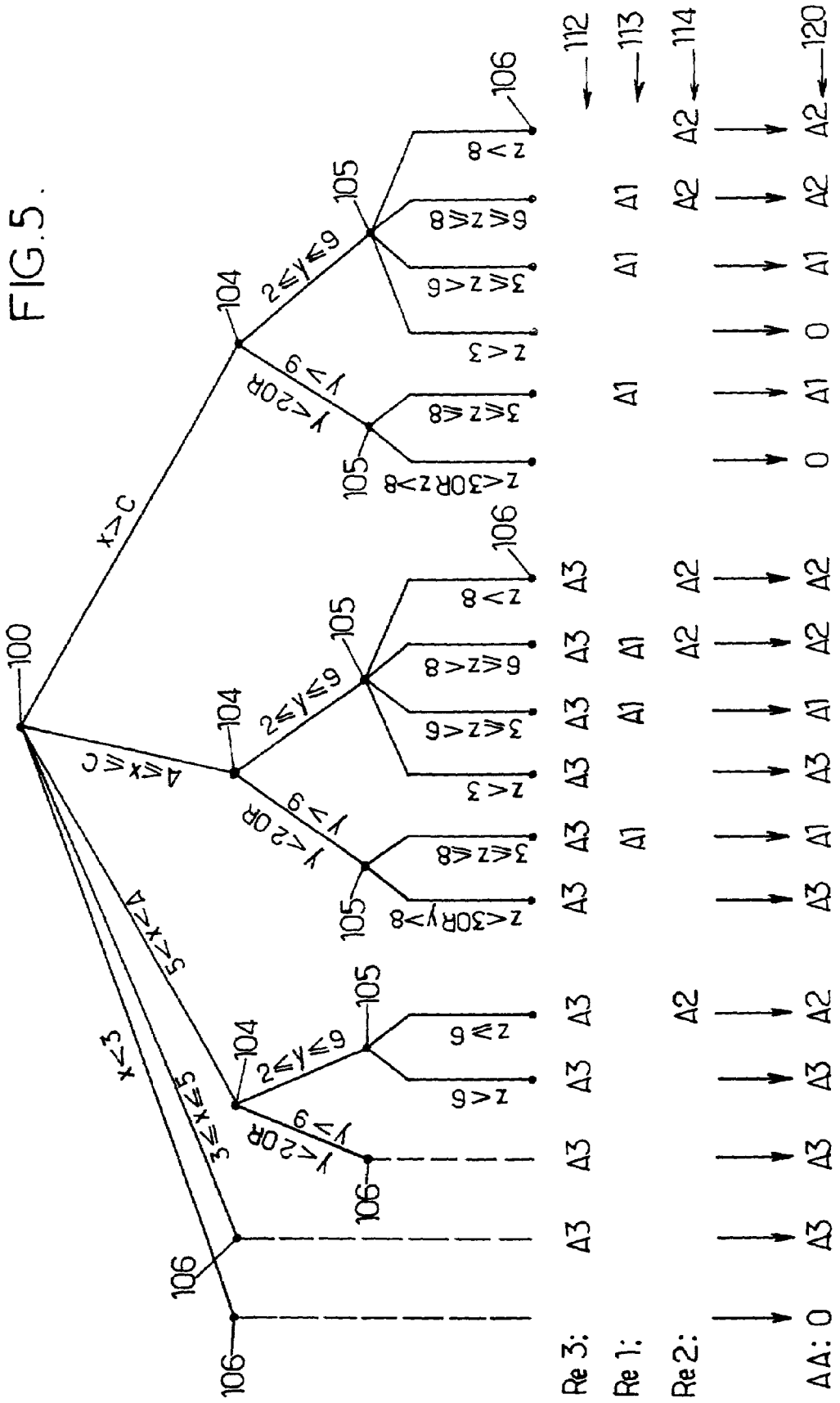
FIG. 5 represents an analysis tree resulting from three particular rules applied to triplets of numbers (x, y, z), and not using the sorting of the locations according to the first improvement of the present invention.

FIG. 5 represents an analysis tree corresponding to the foregoing three rules Re1, Re2 and Re3 first of all analyzing the value of x, then the value of y, and finally the value of z. This analysis tree is constructed in the same way as the trees of FIGS. 3 and 4. The references 100 and 120 possess the meanings already introduced. Nodes 104 correspond to the results of the analysis of the value of x which does not make it possible directly to determine the action attributed by each rule, namely 5<x<A, $A \leq x \leq C$ and x>C. Likewise, nodes 105 correspond to the results of the analysis of the value of y when the analysis of the triplets has to be further continued by the analysis of the value of z. Depending on the paths, the leaves 106 of the analysis tree are linked by direct arcs to the nodes 100, 104 or 105.

Rows 112, 113 and 114, for each of the leaves 106, indicate the actions attributed respectively by each of the three rules, taken in increasing order of priority. A row 120 designates the final action attributed to each triplet (x, y, z) on the basis of the priority among the actions indicated by the three rules.

A Trie memory is still used, for example, with sixteen individual cells per register. In this case, the configuration of the Trie memory, according to this first analysis tree, requires as many registers as there are nodes 100, 104 or 105, i.e. 9 registers in total.

An example configuration of this Trie memory corresponding to the analysis tree of FIG. 5 is as follows:

|     | 0  | 1  | 2  | 3  | 4  | 5  | 6  | 7  | 8  | 9  | A  | B  | C  | D  | E  | F  |
|-----|----|----|----|----|----|----|----|----|----|----|----|----|----|----|----|----|
| R0  | ○  | ○  | ○  | A3 | A3 | A3 | 1  | 1  | 1  | 1  | 3  | 3  | 3  | 6  | 6  | 6  |
| R1  | A3 | A3 | 2  | 2  | 2  | 2  | 2  | 2  | 2  | 2  | A3 | A3 | A3 | A3 | A3 | A3 |
| R2  | A3 | A3 | A3 | A3 | A3 | A3 | A2 | A2 | A2 | A2 | A2 | A2 | A2 | A2 | A2 | A2 |
| R3  | 4  | 4  | 5  | 5  | 5  | 5  | 5  | 5  | 5  | 5  | 4  | 4  | 4  | 4  | 4  | 4  |
| R4  | A3 | A3 | A3 | A1 | A1 | A1 | A1 | A1 | A1 | A3 | A3 | A3 | A3 | A3 | A3 | A3 |
| R5  | A3 | A3 | A3 | A1 | A1 | A1 | A2 | A2 | A2 | A2 | A2 | A2 | A2 | A2 | A2 | A2 |
| R6  | 7  | 7  | 8  | 8  | 8  | 8  | 8  | 8  | 8  | 8  | 7  | 7  | 7  | 7  | 7  | 7  |
| R7  | ○  | ○  | ○  | A1 | A1 | A1 | A1 | A1 | A1 | ○  | ○  | ○  | ○  | ○  | ○  | ○  |
| R8  | ○  | ○  | ○  | A1 | A1 | A1 | A2 | A2 | A2 | A2 | A2 | A2 | A2 | A2 | A2 | A2 |
| R9  |    |    |    |    |    |    |    |    |    |    |    |    |    |    |    |    |
| R10 |    |    |    |    |    |    |    |    |    |    |    |    |    |    |    |    |

Figure 6:
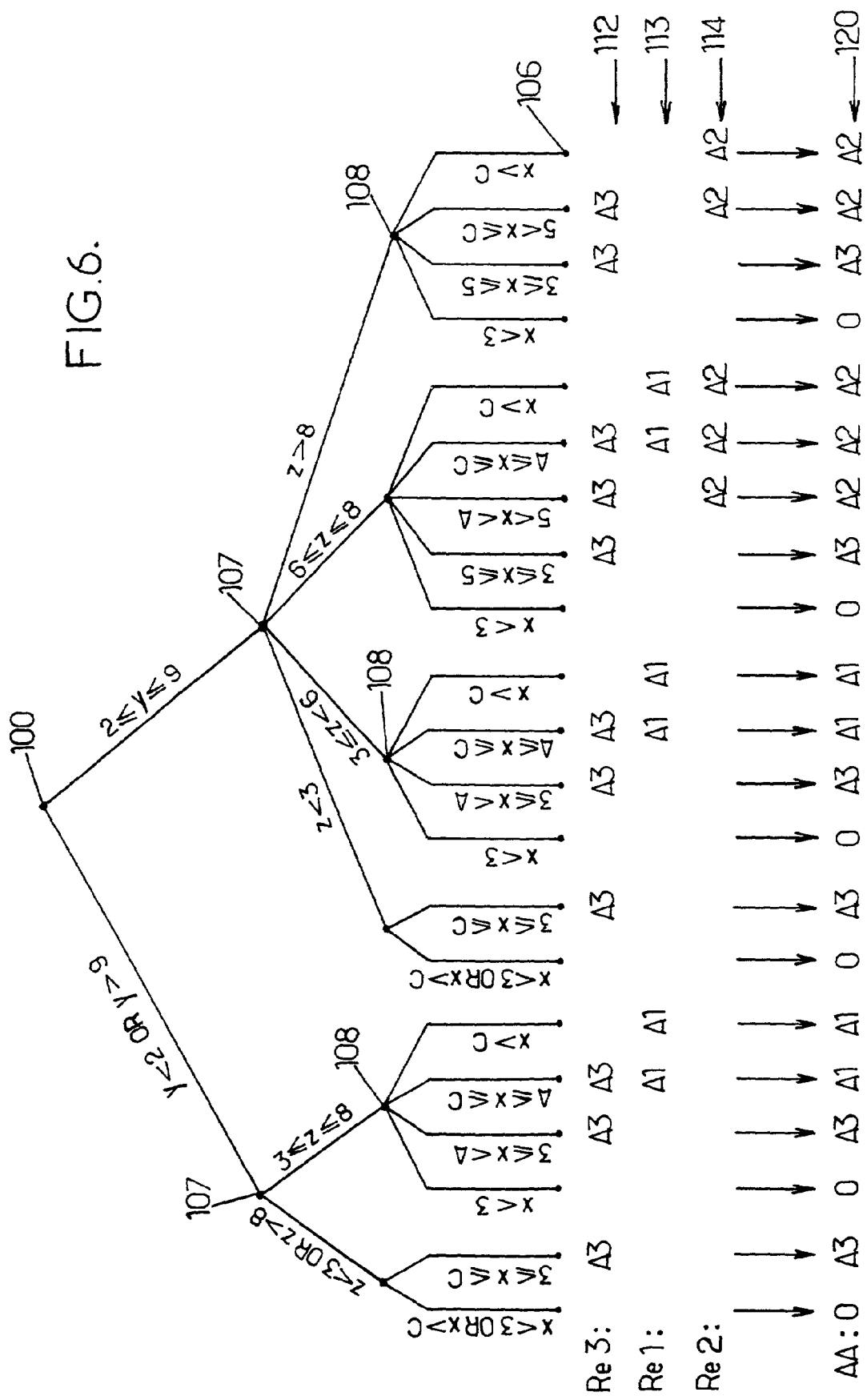
FIG. 6 represents a second analysis tree corresponding to the rules given for the analysis tree of FIG. 5, using the sorting of the locations according to the first improvement of the present invention.

Likewise, FIG. 6 represents an analysis tree corresponding to the rules Re1, Re2 and Re3 analyzing the value of y first of all, then the value of z, and, lastly, that of x, in accordance with the increasing order of the number of intervals defined respectively for x, y and z. Two intermediate nodes 107 correspond to the results of the analysis of the values of y, carried out first, and six intermediate nodes 108 correspond to the results of the analysis of the values of z, carried out next.

In this analysis tree of FIG. 6, the sub-trees corresponding to the results of the subsequent analyses of y then z [(y<2 or y>9) and (z<3 or z>8)] on the one hand, and [$2 \leq y \leq 9$ and z<3] on the other hand, are matching. Likewise for the sub-trees [(y<2 or y>9) and $3 \leq z \leq 8$] on the one hand, and [$2 \leq y \leq 9$ and $3 \leq z < 6$] on the other hand. More-over, in FIG. 6, the actions AA attributed on the basis of the value of x, according to the row 120 for values of y and z such that [$2 \leq y \leq 9$ and $6 \leq z \leq 8$] on the one hand and [$2 \leq y \leq 9$ and z>8] on the other hand are identical. The analysis tree of FIG. 7 then corresponds to that of FIG. 6, grouping the matching sub-trees together.

Figure 7:
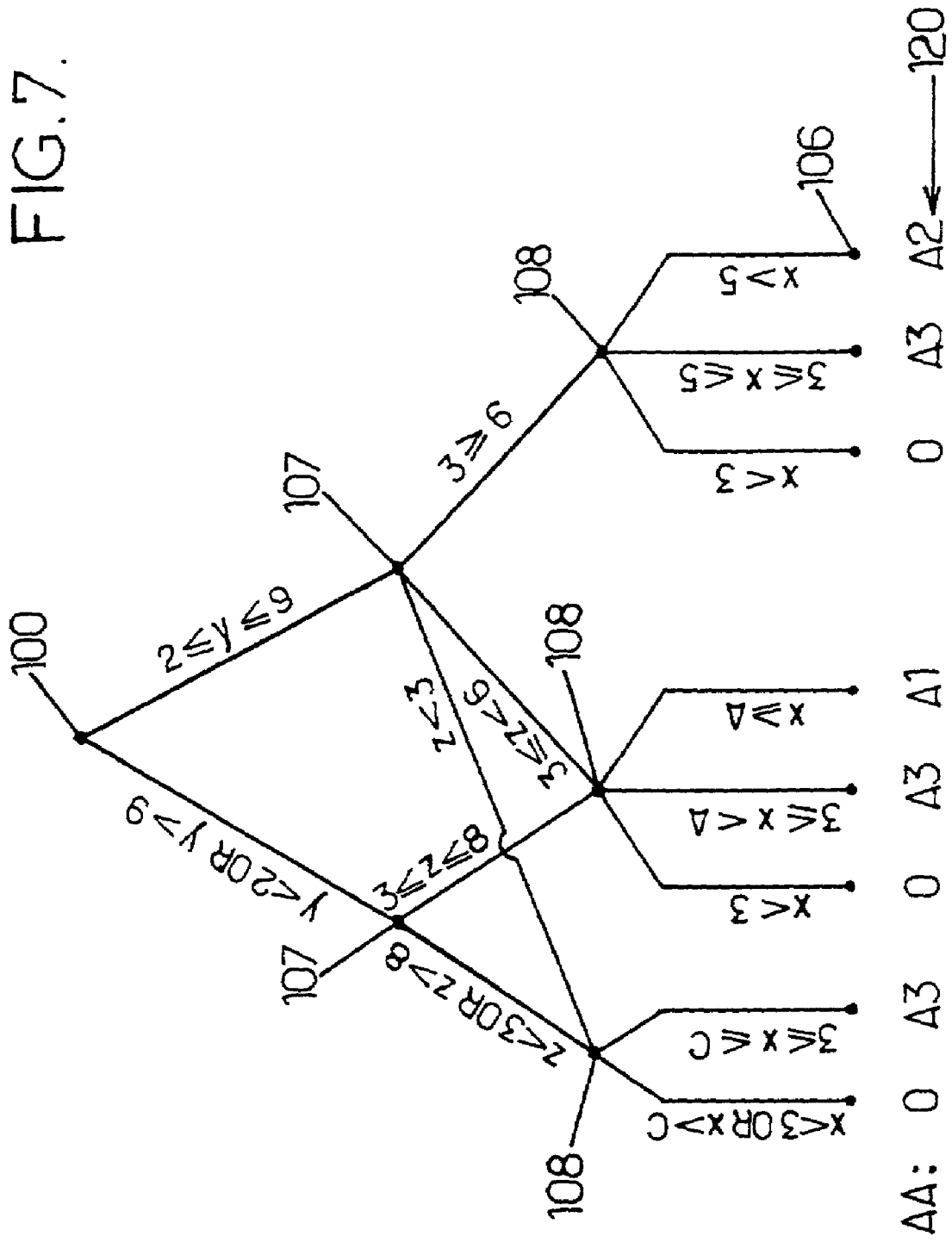
FIG. 7 represents a third analysis tree corresponding to the rules given for the analysis tree of FIG. 5, furthermore using groupings of matching sub-trees.

The configuration of the Trie memory, according to this last analysis tree, requires as many registers as there are nodes 100, 107 or 108 i.e. 6 registers in total. Thus, 3 Trie-memory registers have been saved by comparison with the configuration of the Trie memory arising from the analysis tree of FIG. 5. An example configuration of the Trie memory which corresponds to the analysis tree of FIG. 7 is:

node of the arc is a leaf 102, 106 associated with the default action O, in accordance with the step 201.

In the positive case, the second question 210 consists in searching among the rules $R_{j_1}$ identified in the step 200, the rules $R_{j_2}$ having at least one range corresponding to a location $E_q$ following the location $E_p$ in the sorting order of the locations. If none of the rules $R_{j_1}$ possesses any range corresponding to a location following $E_p$, then (step 211) the arrival point of the arc is a leaf 102,106 associated with the action of the rule of highest priority among the rules $R_{j_1}$ identified in the step 200.

In case of rules $R_{j_2}$ are identified in the step 210 a node $N^{p+1}$ already created in the stage (p+1) of the analysis tree and associated with the subset $\{R_{j_2}\}$ of the identified rules is searched, in a step 220. If such node $N^{p+1}$ already created is found, this node is the arrival point of the new arc originating from the node $N^p$ (step 222). If such node does not exist, a new node $N^{p+1}$ is created in the stage (p+1) and associated with the subset $\{R_{j_2}\}$ of the rules identified in the step 210 (step 221).

This analysis is repeated for each domain D determined for the location $E_p$, in order to derive the arc originating from the node $E_p$ associated with each of them. It is then repeated in the same way for a next node of the p-th stage of the analysis tree, until there is no node left in this stage. Finally, it is repeated again for all the nodes of the next stage (p+1), in such a way to continue with constructing the analysis tree.

|    | 0 | 1 | 2 | 3  | 4  | 5  | 6  | 7  | 8  | 9  | A  | B  | C  | D  | E  | F  |
|----|---|---|---|----|----|----|----|----|----|----|----|----|----|----|----|----|
| R0 | 1 | 1 | 4 | 4  | 4  | 4  | 4  | 4  | 4  | 4  | 1  | 1  | 1  | 1  | 1  | 1  |
| R1 | 2 | 2 | 2 | 3  | 3  | 3  | 3  | 3  | 3  | 2  | 2  | 2  | 2  | 2  | 2  | 2  |
| R2 | ○ | ○ | ○ | A3 | A3 | A3 | A3 | A3 | A3 | A3 | A3 | A3 | A3 | ○  | ○  | ○  |
| R3 | ○ | ○ | ○ | A3 | A3 | A3 | A3 | A3 | A3 | A3 | A1 | A1 | A1 | A1 | A1 | A1 |
| R4 | 2 | 2 | 2 | 3  | 3  | 3  | 5  | 5  | 5  | 5  | 5  | 5  | 5  | 5  | 5  | 5  |
| R5 | ○ | ○ | ○ | A3 | A3 | A3 | A2 | A2 | A2 | A2 | A2 | A2 | A2 | A2 | A2 | A2 |
| R6 |   |   |   |    |    |    |    |    |    |    |    |    |    |    |    |    |
| R7 |   |   |   |    |    |    |    |    |    |    |    |    |    |    |    |    |

Figure 8:
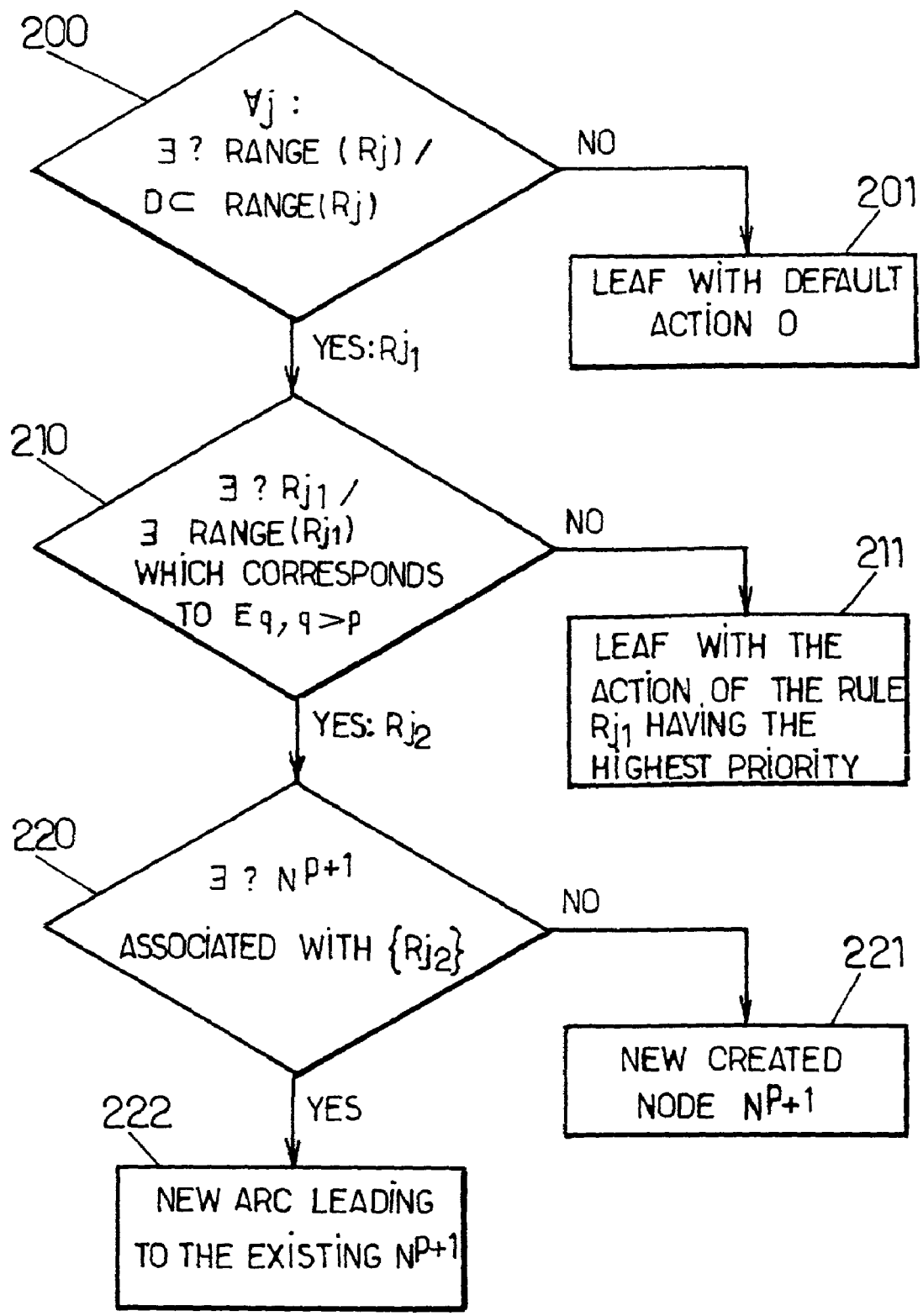
FIG. 8 is a block diagram of the steps for creating a new arc according to the second improvement of the invention.

FIG. 8 shows in detail the various steps for creating a new arc of the analysis tree according to the second improvement of the method of the invention, which avoids, from the building of the analysis tree, the creation of matching sub-trees. The issue is to determine the arrival point of a new arc originating from a node $N^p$ of a p-th stage of the analysis tree, and associated with a particular domain D for the location $E_p$ associated with the p-th stage.

The method described is applied in a recurrent way at each stage of the analysis tree, taken according to the order of the locations respectively associated with the stages. This method generates the nodes of the analysis tree, at the same time it attributes to each created node a subset of rules. So, before the implementation of the present method to the node $N^p$, a subset $\{R_j\}$ of rules is already associated with this node, j being a numbering integer.

It is assumed that each rule $R_j$ attributes an action when, for certain locations, the binary string read at this location is falling into a range of values specified by this rule. This formula of the rules $R_j$ corresponds to that of the preceding examples.

Within a first question 200, those among the rules $R_j$ having a range containing the domain D for which the arc is being constructed are searched. In case of none of the rules $R_j$ possess a range containing the domain D, then the arrival This method for creating new arcs is implemented for the construction of a fourth tree corresponding to the rules given by reference to FIG. 5. In the same way as for FIG. 6, the locations are sorted in an order according to the first improvement of the invention. The tree so obtained in represented on FIG. 9.

For each node of the tree, the subset of rules $\{R_{j_2}\}$ associated with this rule is indicated. For the leaves 106 the row 121 indicates the rules $R_{j_1}$ which determine, on the basis of their relative priorities, the actions associated with these leaves and indicated by the row 120.

The various configuration examples of Trie memories presented in detail in this application show the benefit of the method of the invention for the configuration of a Trie memory. The sorting of the locations, combined as appropriate with the regrouping of the matching analysis sub-trees, makes it possible to reduce the necessary number of registers of a Trie memory used for assigning to ATM cells actions designated by fixed rules. The reductions obtained in the examples presented are in keeping with the simplicity of these examples. For real access control policies, the reductions obtained by the application of the same principles may be sizeable, depending, as the case may be, on the number of rules, the number and the size of the fields considered, and the elementary intervals associated with the fields.

Actually, the configuring of the Trie memory according to the invention is carried out in step with the introduction of new rules, or with the deletion of rules, within the access control manager. This manager comprises a compilation module which constructs and modifies the analysis trees on the basis of the updates of rules introduced, before modifying the existing configuration of the Trie memory.

The invention claimed is:

1. Method for configuring a Trie-type associative memory for the processing of data packets based on a set of rules, the Trie memory being used for analyzing binary strings situated at defined locations in each data packet, whereby each rule attributes an action to a packet based on the values of the binary strings, wherein the Trie memory includes registers made up of a defined number of individual cells for receiving respective references, the method comprising the steps of:
   a—translating the set of rules into a packet analysis tree, comprising nodes distributed into successive stages respectively associated with the locations considered in a defined order, arcs and leaves corresponding to actions which can be attributed by the rules, the first stage of the tree comprising a single node called root node of the analysis tree,
      each arc having a start node and an arrival point consisting either of a node of the stage following that of said start node or of a leaf, and being associated with a respective domain of binary string values possible at said location,
      the analysis tree defining paths each consisting of a series of n arcs, n being an integer at least equal to 1, the first arc of the series having as start node the root node of the analysis tree,
      the arrival point of each arc of a path other than the last arc being the start node of the following arc of said path, and the arrival point of the last arc of the path being a leaf corresponding to an action attributed according to the set of the rules to each packet having, at the n locations associated respectively with the stages of the start nodes of the n arcs of said path, binary string values falling into the n domains associated respectively with said arcs;
   b—allocating a group of registers of the Trie memory, including a gatekeeper register, to each node of the analysis tree belonging to a stage associated with a location, and recording references in the cells of the group of registers such that, by analyzing from the gatekeeper register the binary string value contained at said location in a packet, a final reference is obtained depending on which domain contains the value from among the domains of values associated with the arcs having said node as start node and such that:
      if the arc associated with the domain containing the value has, as arrival point, a leaf corresponding to an action, the final reference designates the action as being attributed to the packet, and
      if the arc associated with the domain containing the value has another node of the following stage as arrival point, the final reference designates said other node so as to carry on by analyzing the binary string value contained in the packet at the location associated with said following stage.

2. Method according to claim 1, further comprising the steps of:
   i—for each one of the locations, determining consecutive elementary intervals covering binary string values possibly appearing at said one of the locations, each elementary interval being such that the action attributed by each of the rules is not altered by a change, within said elementary interval, of the value of the binary string situated at said location in a processed packet; and
   ii—counting the elementary intervals determined for each location,
wherein said defined order of the locations is such that the location for which the largest number of elementary intervals has been determined is placed last.

3. Method according to claim 2, wherein said order of the locations is defined by sorting the locations in order of increasing numbers of elementary intervals.

4. Method according to claim 2, wherein the elementary intervals determined for each location comprise interval bounds, and wherein each interval bound corresponds to the change of an action which can be attributed by at least one rule.

5. Method according to claim 1, wherein the step of translating the set of rules is such that at least one node of the analysis tree is the arrival point of a plurality of arcs originating from distinct start nodes of the preceding stage.

6. Method according to claim 1, wherein a sub-tree is associated with each node of the analysis tree other than the root of the analysis tree, said sub-tree having a root constituted by said node and being made up of the nodes, arcs and leaves encountered from said node along the paths passing through said node, and wherein the step of translating the set of rules is such that the analysis tree does not include any first and second sub-trees having distinct roots and such that the respective nodes, arcs and leaves of said first and second sub-trees can be paired so that each node of the first sub-tree is paired with a node of the second sub-tree belonging to a same stage, that each leaf of the first sub-tree is paired with a leaf of the second sub-tree corresponding to a same action, and that two arcs paired of the first and second sub-trees have start nodes which are paired together and arrival nodes which are paired together, and are associated with the same domain of values.

7. Method according to claim 1, wherein each rule of the set is defined by an action and by ranges of values corresponding to at least some of the locations, and attributes the action to the packets having, at said at least some of the locations, binary string values falling into the respective ranges.

8. Method according to claim 7, further comprising the step of associating a subset of rules with each node of a (p+1)-th stage of the analysis tree, p being an integer greater than 0, said subset being composed of the rules of the set such that each range of values corresponding to a location associated with one of the p first stages of the tree has a non-empty overlap with the domain of values associated with the arc of each path passing through said node and having a start node in said stage.

9. Method according to claim 8, wherein a subset consisting of the set of the rules is associated with the root node, and wherein the translation of the set of rules comprises the following steps for each node of the p-th stage associated with a first subset of rules:
   determining domains of values covering binary string values possibly appearing at the p-th location considered in said order, whereby each domain is such that the action attributed by each of the rules of the first subset is not altered by a change, within said domain, of the value of the binary string situated at the p-th location in a processed packet; and for each of said domains of values:
generating an arc associated with said domain, having said node of the p-th stage as start node;
detecting each rule of the first subset which is defined by at least one range of values including said domain;
if no rule detected, assigning a leaf of the tree corresponding to a default action as arrival point of said arc;
if, for each detected rule, no range of values corresponds to any one of the locations following the p-th location in said order, assigning a leaf of the tree corresponding to an action of a detected rule as arrival point of said arc;
if, for at least one detected rule, a range of values corresponds to one of the locations following the p-th location in said order, attributing a node of the (p+1)-th stage of the tree as arrival point of said arc, said node of the (p+1)-th stage being associated with a second subset composed of the detected rules of the first subset.

10. Method according to claim 9, wherein priorities are respectively assigned to the rules of the set, and wherein, when a plurality of rules are detected and none of the ranges of values of said plurality of rules corresponds to one of the locations following the p-th location, the action corresponding to the leaf of the tree attributed to said arc is the action of one of said plurality of rules, selected on the basis of the assigned priorities.

11. Method according to claim 9, further comprising the following steps when at least one rule is detected having a range of values corresponding to one of the locations following the p-th location:
searching whether a node of the (p+1)-th stage of the tree associated with the second subset has already been generated;
if the search fails, generating such node in the (p+1)-th stage;
if the search identifies a node of the (p+1)-th stage, attributing the identified node as arrival point of said arc.

12. A device for processing data packets, comprising a Trie-type associative memory for the analysis of binary strings situated at defined locations in each data packet, and a controller for configuring the Trie memory for the processing of the data packets on the basis of a set of rules, whereby each rule attributes an action to a packet based on values of the binary strings, the Trie memory including registers made up of a defined number of individual cells for receiving respective references, wherein the controller comprises:
a—means for translating the set of rules into a packet analysis tree, comprising nodes distributed into successive stages respectively associated with the locations considered in a defined order, arcs and leaves corresponding to actions which can be attributed by the rules, the first stage of the tree comprising a single node called root node of the analysis tree,
each arc having a start node and an arrival point consisting either of a node of the stage following that of said start node or of a leaf, and being associated with a respective domain of binary string values possible at said location,
the analysis tree defining paths each consisting of a series of n arcs, n being an integer at least equal to 1, the first arc of the series having as start node the root node of the analysis tree,
the arrival point of each arc of a path other than the last arc being the start node of the following arc of said path, and the arrival point of the last arc of the path being a leaf corresponding to an action attributed according to the set of the rules to each packet having, at the n locations associated respectively with the stages of the start nodes of the n arcs of said path, binary string values falling into the n domains associated respectively with said arcs;
b—means for allocating a group of registers of the Trie memory, including a gatekeeper register, to each node of the analysis tree belonging to a stage associated with a location, and for recording references in the cells of the group of registers such that, by analyzing from the gatekeeper register the binary string value contained at said location in a packet, a final reference is obtained depending on which domain contains the value from among the domains of values associated with the arcs having said node as start node and such that:
if the arc associated with the domain containing the value has, as arrival point, a leaf corresponding to an action, the final reference designates the action as being attributed to the packet, and
if the arc associated with the domain containing the value has another node of the following stage as arrival point, the final reference designates said other node so as to carry on by analyzing the binary string value contained in the packet at the location associated with said following stage.

13. Device according to claim 12, wherein the data packets comprise ATM cells carrying AAL 5 frames.

14. Device according to claim 12, wherein the data packets comprise IP packets.

15. Device according to claim 12, arranged for the routing, by a communications network, of data packets on the basis of routing rules applied to said packets.

16. Device according to claim 12, arranged for the control of access to a communications network by data packets on the basis of access control rules applied to said packets.

17. Device according to claim 12, arranged for the acquisition of information relating to data packets transmitted by a communications network.

18. Device according to claim 12, wherein the controller further comprises:
i—means for determining consecutive elementary intervals for each one of the locations, wherein each of said elementary intervals covers binary string values possibly appearing at said one of the locations, each elementary interval being such that the action attributed by each of the rules is not altered by a change, within said elementary interval, of the value of the binary string situated at said location in a processed packet; and
ii—means for counting the elementary intervals determined for each location,
wherein said defined order of the locations is such that the location for which the largest number of elementary intervals has been determined is placed last.

19. Device according to claim 18, wherein said order of the locations is defined by sorting the locations in order of increasing numbers of elementary intervals.

20. Device according to claim 18, wherein the elementary intervals determined for each location comprise interval bounds, and wherein each interval bound corresponds to the change of an action which can be attributed by at least one rule.

21. Device according to claim 12, wherein the means for translating the set of rules are so arranged that at least one node of the analysis tree is the arrival point of a plurality of arcs originating from distinct start nodes of the preceding stage.

22. Device according to claim 12, wherein a sub-tree is associated with each node of the analysis tree other than the root of the analysis tree, said sub-tree having a root constituted by said node and being made up of the nodes, arcs and leaves encountered from said node along the paths passing through said node, and wherein the means for translating the set of rules are so arranged that the analysis tree does not include any first and second sub-trees having distinct roots and such that the respective nodes, arcs and leaves of said first and second sub-trees can be paired so that each node of the first sub-tree is paired with a node of the second sub-tree belonging to a same stage, that each leaf of the first sub-tree is paired with a leaf of the second sub-tree corresponding to a same action, and that two arcs paired of the first and second sub-trees have start nodes which are paired together and arrival nodes which are paired together, and are associated with the same domain of values.

23. Device according to claim 12, wherein each rule of the set is defined by an action and by ranges of values corresponding to at least some of the locations, and attributes the action to the packets having, at said at least some of the locations, binary string values falling into the respective ranges.

24. Device according to claim 23, wherein the controller further comprises means for associating a subset of rules with each node of a (p+1)-th stage of the analysis tree, p being an integer greater than 0, said subset being composed of the rules of the set such that each range of values corresponding to a location associated with one of the p first stages of the tree has a non-empty overlap with the domain of values associated with the arc of each path passing through said node and having a start node in said stage.

25. Device according to claim 24, wherein a subset consisting of the set of the rules is associated with the root node, and wherein the means for translating the set of rules comprise:
  means for determining, for each node of the p-th stage associated with a first subset of rules, domains of values covering binary string values possibly appearing at the p-th location considered in said order, whereby each domain is such that the action attributed by each of the rules of the first subset is not altered by a change, within said domain, of the value of the binary string situated at the p-th location in a processed packet;
  means for generating an arc associated with each one of said domains of values, having said node of the p-th stage as start node;
  means for detecting each rule of the first subset which is defined by at least one range of values including said one of the domains;
  means for assigning a leaf of the tree corresponding to a default action as arrival point of said arc if no rule detected;
  means for assigning a leaf of the tree corresponding to an action of a detected rule as arrival point of said arc if, for each detected rule, no range of values corresponds to any one of the locations following the p-th location in said order; and
  means for attributing a node of the (p+1)-th stage of the tree as arrival point of said arc if, for at least one detected rule, a range of values corresponds to one of the locations following the p-th location in said order, said node of the (p+1)-th stage being associated with a second subset composed of the detected rules of the first subset.

26. Device according to claim 25, wherein priorities are respectively assigned to the rules of the set, and wherein the means for assigning a leaf of the tree corresponding to an action of a detected rule comprise means for selecting said detected rule on the basis of the assigned priorities when a plurality of rules are detected and none of the ranges of values of said plurality of rules corresponds to one of the locations following the p-th location.

27. Device according to claim 25, wherein the means for attributing a node of the (p+1)-th stage of the tree as arrival point of said arc comprise
  means for searching whether a node of the (p+1)-th stage of the tree associated with the second subset has already been generated;
  means for generating such node in the (p+1)-th stage if the search fails; and
  means for, if the search identifies a node of the (p+1)-th stage, attributing said identified node as arrival point of said arc.

* * * * *